(12) United States Patent
Grzeslak et al.

(10) Patent No.: US 7,927,402 B1
(45) Date of Patent: Apr. 19, 2011

(54) PASSIVE DESICCANT SYSTEM

(75) Inventors: Kazimierz T. Grzeslak, Bedford, NH (US); Jason Stockwell, Brookline, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 205 days.

(21) Appl. No.: 12/349,953

(22) Filed: Jan. 7, 2009

Related U.S. Application Data

(60) Provisional application No. 61/010,327, filed on Jan. 7, 2008.

(51) Int. Cl.
*B01D 53/02* (2006.01)

(52) U.S. Cl. .......... 95/117; 95/90; 95/122; 96/108; 244/1 R; 244/3.1; 250/234; 372/9

(58) Field of Classification Search ............. 95/90, 117, 95/122; 96/108; 244/1 R, 3.1; 250/234; 372/9
See application file for complete search history.

(56) References Cited

U.S. PATENT DOCUMENTS

| | | | | |
|---|---|---|---|---|
| 2,801,706 A | * | 8/1957 | Asker | 95/123 |
| 2,801,707 A | * | 8/1957 | Asker | 95/106 |
| 4,028,991 A | * | 6/1977 | Kuby | 89/41.03 |
| 6,932,907 B2 | * | 8/2005 | Haq et al. | 210/433.1 |
| 2005/0000196 A1 | * | 1/2005 | Schultz | 55/385.2 |
| 2006/0085130 A1 | * | 4/2006 | Belenkii et al. | 701/222 |
| 2007/0038374 A1 | * | 2/2007 | Belenkii et al. | 701/222 |

* cited by examiner

*Primary Examiner* — Robert J Hill, Jr.
*Assistant Examiner* — Christopher P Jones
(74) *Attorney, Agent, or Firm* — Daniel J. Long, Esq.; Robert K. Tendler, Esq.

(57) ABSTRACT

In a method for removing moisture from an optical system at high altitude, the improvement comprises using the difference in flow resistance between the desiccant path and the optical cavity path to enable airflow through the desiccant unit and not through the optical path.

2 Claims, 2 Drawing Sheets

PASSIVE DESICCANT SYSTEM

CROSS-REFERENCE TO RELATED APPLICATION

This application claims rights under 35 U.S.C. 119(e) from U.S. Application Ser. No. 61/010,327 filed Jan. 7, 2008, the contents of which are incorporated herein by reference.

STATEMENT OF GOVERNMENT INTEREST

This invention was made with United States Government assistance under Contract No. HSSCHQ-04-C-00342 awarded by the Department of Homeland Security. The United States Government has certain rights in this invention.

BACKGROUND OF THE INVENTION

1. Field of the Invention

The present invention relates to passive desiccant systems and more particularly to passive desiccant systems for use with optical systems on aircraft.

2. Brief Description of Prior Developments

Optical systems installed on high altitude flying aircraft are exposed to varying pressures and temperatures due to changing environmental conditions. In the case of partially sealed optical systems moisture can penetrate the seals and create an obscuration in the optical path as the aircraft flies to altitude and the optics are exposed to low temperatures.

A high rate of air flow shortens the life of the desiccant; necessitates a short replacement cycle; provides high moisture content under slightly degraded condition; allows excessive moisture to be injected due to high air flow; and creates condensation at high altitudes due to pressure differential between cabin and ambient air.

A need exists, therefore, for a way to keep moisture out of an optical system when systems are mounted external to the aircraft.

SUMMARY OF INVENTION

The passive desiccant system of the present invention employs the difference in pressure between the inside and the outside of the optical cavity. The system uses the difference in flow resistance between the desiccant path and the optical cavity path to enable the airflow through the desiccant unit and not through the optical cavity. The solution is based on differences in flow resistance between elements within the pneumatic path.

This system may be used, for example, in a system for protecting commercial aircraft from shoulder-fired missiles. When used in this way, the active system consists of a gimballed head that tracks and points a laser beam at the incoming missile to defeat its guidance system. Without proper guidance the missile is unable to reach and destroy the aircraft. Moisture in the head will condense and form obscuration on the optical elements found in the head. Once the optical path is obscured the alignment of the laser through the head is lost. The passive desiccant system uses a canister of desiccant and atmospheric pressure to ensure dry air is used to fill the head on its return from high altitude and prevent the obscuration from forming. This idea is based on the difference in air flow resistance between the exposed elements and air flow path created by the desiccant unit.

BRIEF DESCRIPTION OF THE DRAWINGS

The present invention is further described with reference to the accompanying drawings wherein.

DETAILED DESCRIPTION OF THE PREFERRED EMBODIMENT

Figure 1:
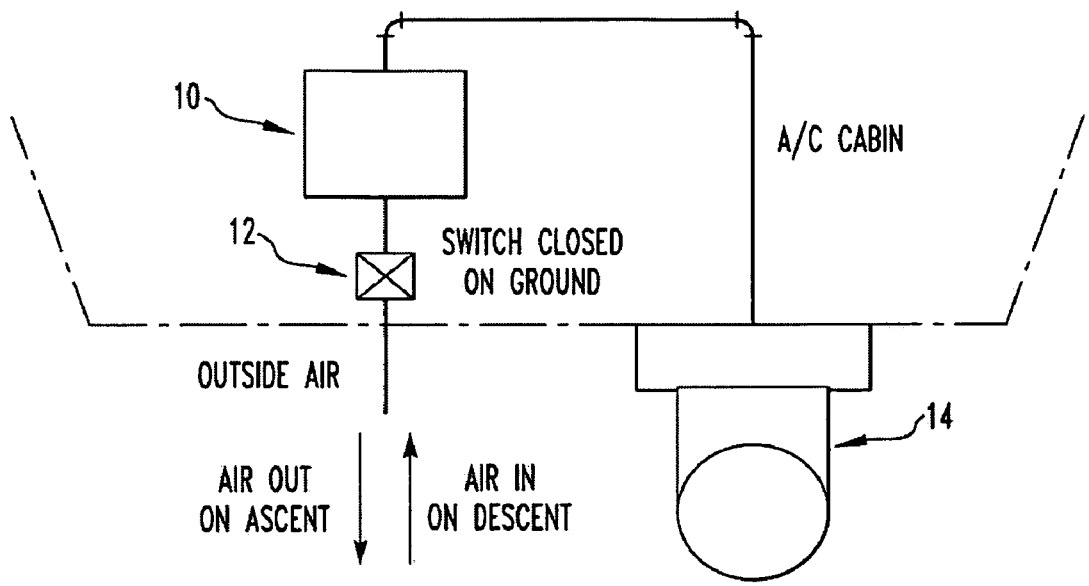
FIG. 1 is a schematic concept diagram of a preferred embodiment of the present invention.

Referring to FIG. 1, the system includes a desiccant cartridge 10 connected to a 28 volt direct current VDC switch 12 inside the aircraft cabin. The optical element 14 is outside the cabin. The switch is closed on the ground so air flows out on ascent and air flows in on descent. There is no air flow into the optical element due to lower air flow resistance via the desiccant path.

Figure 2:
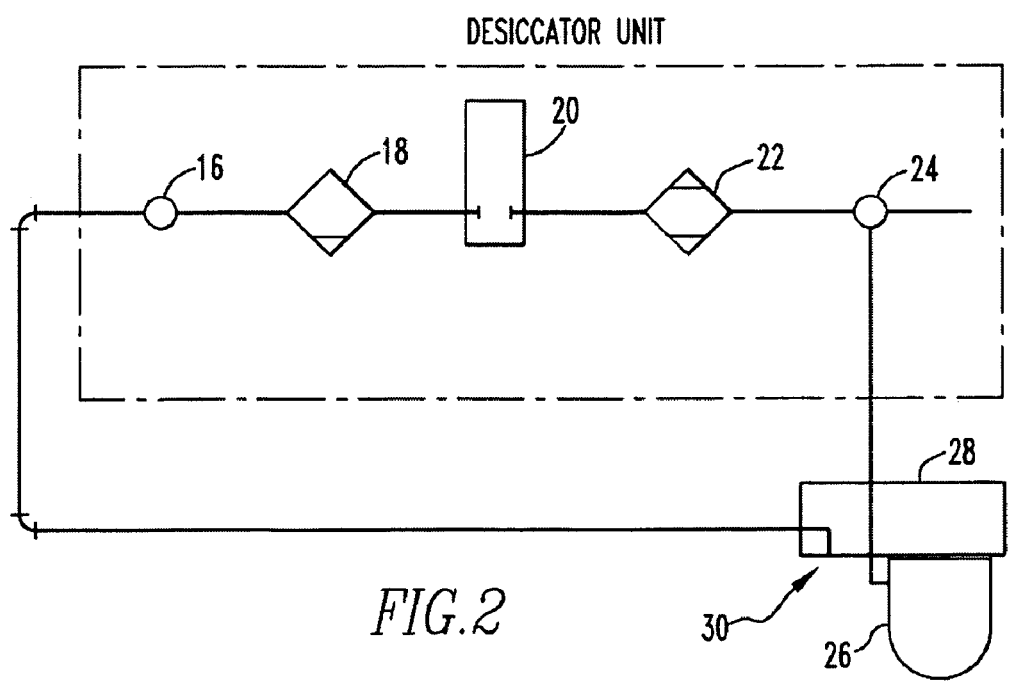
FIG. 2 is a schematic diagram of the embodiment shown in FIG. 1.

Referring to FIG. 2, the desiccation unit includes an ambient reference port 16, an air filter 18, a solenoid valve 20, a desiccant cartridge 22, and a dry air supply port 24, which is connected to the pointer tracker head, PTH 26. The LTA 28 has a laser transmitter assembly, LTA ambient port 30, which is connected to the ambient reference port 16.

Figure 3:
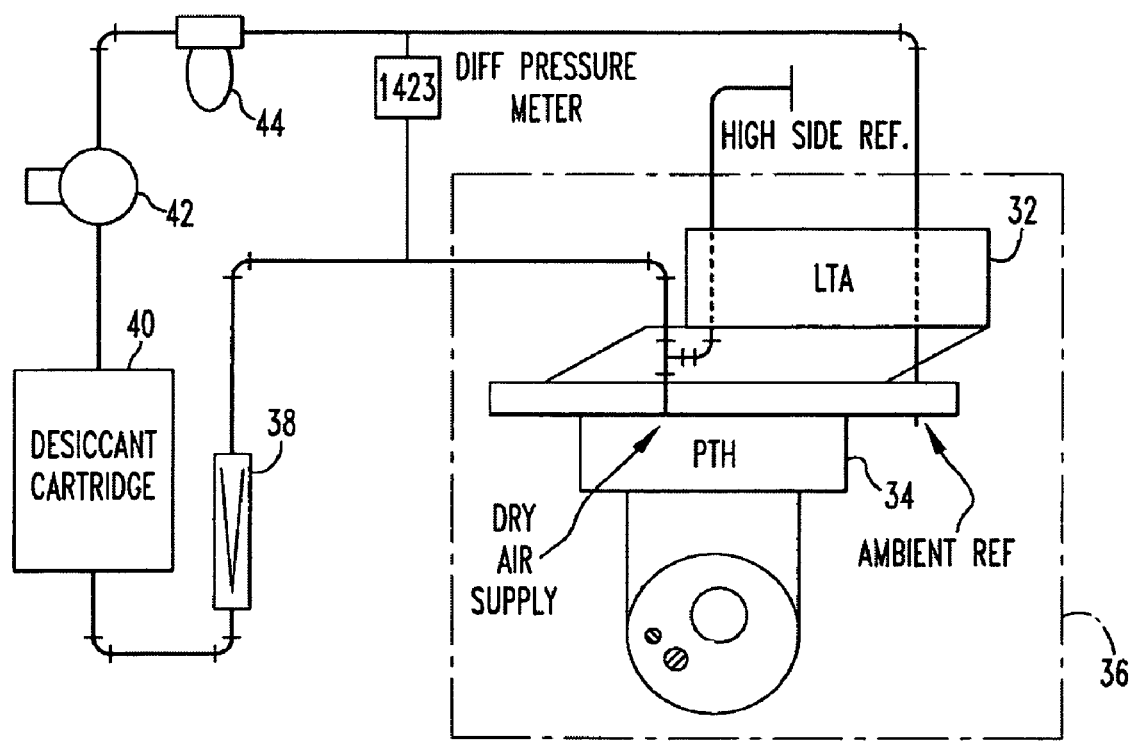
FIG. 3 is a detailed schematic diagram of the embodiment shown in FIG. 2.

Referring to FIG. 3, in a test the LTA 32 and PTH 34 may be placed in a temperature and altitude chamber 36. A dry air supply is connected to a flow meter 38, which is connected to a desiccant cartridge 40, which is in turn connected to a solenoid valve 42. Solenoid valve 42 is connected to a water trap 44, which is connected to the ambient reference inside the temperature and altitude chamber.

Those skilled in the art will appreciate that the system described herein provides greatly improved lifecycle of the unit, reduces lifecycle cost, greatly simplifies the system implementation, and eliminates condensation leading to optical obscuration.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for removing moisture from an optical system including a pointer tracker head carried by an aircraft in which moisture accumulates on the inside of the pointer tracker head when the aircraft descends from a high altitude, comprising the steps of:

providing a path from the ambient outside an aircraft through a desiccant to a pointer tracker head; and, permitting flow through the desiccant away from the pointer tracker head to the ambient when the aircraft leaves the ground such that when the aircraft ascends, air within the pointer tracker head is expelled through the path, making the air pressure in the head lower as the aircraft ascends, and such that upon aircraft descent air is ingested through the desiccant to fill the head, with resultant desiccated air filling the head due to the lower pressure in the head, thus to remove moisture from the head.

2. The method of claim 1 and further including the step of preventing flow through the desiccant when the aircraft is on the ground so as not to use up the desiccant.

\* \* \* \* \*